(12) United States Patent
Kim

(10) Patent No.: US 11,821,534 B2
(45) Date of Patent: Nov. 21, 2023

(54) WATER SUPPLY DEVICE FOR SANITARY CERAMICS

(71) Applicant: ACE LIFE CO., LTD., Asan-si (KR)

(72) Inventor: Chang Ho Kim, Pyeongtaek-si (KR)

(73) Assignee: ACE LIFE CO., LTD., Asan-si (KR)

( * ) Notice: Subject to any disclaimer, the term of this patent is extended or adjusted under 35 U.S.C. 154(b) by 28 days.

(21) Appl. No.: 17/373,852

(22) Filed: Jul. 13, 2021

(65) Prior Publication Data

US 2022/0099206 A1 Mar. 31, 2022

(30) Foreign Application Priority Data

Sep. 28, 2020 (KR) .................. 10-2020-0125648

(51) Int. Cl.
*F16K 1/36* (2006.01)
*F16K 27/02* (2006.01)

(52) U.S. Cl.
CPC ............ *F16K 27/0236* (2013.01); *F16K 1/36* (2013.01)

(58) Field of Classification Search
CPC .......... F16K 31/402; F16K 11/20; F16K 1/36; F16K 27/0236; E03D 1/34
See application file for complete search history.

(56) References Cited

U.S. PATENT DOCUMENTS

| | | | | |
|---|---|---|---|---|
| 3,806,081 A * | 4/1974 | Otto | ...................... | F16K 31/385 251/28 |
| 10,152,065 B2 * | 12/2018 | Ok | ...................... | G05D 16/0663 |
| 10,578,222 B2 * | 3/2020 | Huang | ...................... | B05B 1/18 |
| 11,085,180 B2 * | 8/2021 | Lin | ......................... | E03D 1/141 |
| 2019/0161949 A1 * | 5/2019 | Tang | ...................... | E03D 5/105 |

FOREIGN PATENT DOCUMENTS

| | | | | |
|---|---|---|---|---|
| KR | 20100003034 U | * | 3/2010 | ............. E03D 5/024 |
| KR | 20-0453734 Y1 | | 5/2011 | |
| KR | 20180078387 A | * | 7/2018 | ............... E03D 9/08 |

* cited by examiner

*Primary Examiner* — Umashankar Venkatesan
(74) *Attorney, Agent, or Firm* — Rabin & Berdo, P.C.

(57) ABSTRACT

The present disclosure relates to a water supply device for sanitary ceramics, including a housing including a water supply hole, a water discharge hole, and an opening/closing device including a diaphragm formed above the water discharge hole, a partition cap having a support protrusion and a through-hole through which an upper space communicates with a lower space of the housing, a cam plate configured to gradually open or close the through-hole, a shaft part formed above the cam plate, and a motor formed on the upper surface of the housing to rotate the shaft part, wherein the cam plate, rotating and elevating along the upper surface of the support protrusion of the partition cap, gradually opens or closes the through-hole and gradually opens or closes the water discharge hole by the diaphragm, and thus the flow of water discharged through the water discharge hole is prevented from being suddenly blocked.

7 Claims, 5 Drawing Sheets

WATER SUPPLY DEVICE FOR SANITARY CERAMICS

CROSS-REFERENCE TO RELATED APPLICATION

This application claims priority to and the benefit of Korean Patent Application No. 10-2020-0125648 filed on Sep. 28, 2020, the disclosure of which is incorporated herein by reference in its entirety.

BACKGROUND

1. Field of the Invention

The present disclosure relates to a water supply device, and more particularly, to a water supply device for sanitary ceramics, in which, while rotating and elevating a cam plate along the upper surface of a support protrusion of a partition cap, the cam plate gradually opens or closes a through-hole of the partition cap and gradually opens or closes a diaphragm to correspond to an opening degree of the through-hole, and thus flow of water discharged through a water discharge hole is prevented from being suddenly blocked.

2. Discussion of Related Art

In general, in toilet bowls, residual water always stagnates in portions of bowls in which filth is accommodated, and water is supplied when the filth is discharged and the bowls are cleaned.

Here, a water supply device provided in the toilet bowl is classified into a rim water supply unit that generates a rotating current on the entire surface of the bowl to clean filth or foreign substances attached to the inside of the bowl and a jet water supply unit that causes water to flow toward a drain to discharge the filth inside the bowl into a waste water tank.

Patent Document 1 discloses a manual water supply device for bidet-integrated sanitary ceramics. Referring thereto, the manual water supply device includes a water supply unit that supplies washing water supplied from a water faucet to sanitary ceramics, a fill valve that is seated in first and second pipes of the water supply unit and is selectively opened or closed, and a second operation unit that supplies the washing water to a rim side of a bowl part and a jet waterway by opening a drain hole of the water supply unit by pressing a lever so that the fill valve is operated.

In this case, the second operation unit includes a lever that pressurizes the washing water supplied to the water supply unit so that the washing water is supplied to the rim side of the bowl part and the jet waterway, a rotation member that raises a core of a solenoid valve while rotating about a rotary shaft by the lever to open the drain hole of the water supply unit, and a restoration spring that restores the lever.

Here, the water is discharged simultaneously through the first pipe and the second pipe or is discharged selectively though the first pipe or the second pipe, and thus the water is discharged to the rim side and the jet waterway.

That is, while the water is supplied through the water supply unit, when the solenoid valve is operated to elevate the core upward, the drain hole that is closed by a lower end of the solenoid valve is opened and at the same time, as the pressure on the upper side of the fill valve is lowered, the fill valve is moved upward by the pressure of the water supplied to the water supply unit.

Then, an upper end of the first pipe is opened by the fill valve, and thus a state of communicating with the water supply unit is maintained. In this case, the water is discharged through the upper end of the first pipe, and thus the water is supplied to the rim side.

On the other hand, when the solenoid valve is operated in the same method as above to elevate the core upward, an upper end of the second pipe is opened, and thus the water is supplied to the jet waterway.

However, in Patent Document 1 described above, as the core excessively and vertically elevates by the solenoid valve, the drain hole is momentarily opened and closed, and thus the fill valve is rapidly elevated. An impact is transmitted to the fill valve or the first and second pipes due to the rapid elevation movement of the fill valve, resulting in damage to a product. Further, the water moving in a direction of the first pipe or the second pipe through a water supply pipe collides with the fill valve that rapidly shuts off the first pipe or the second pipe, and thus a water hammer is generated. The water hammer makes a noise inside the product, and thus a user using the water supply device feels anxious. Due to these frequent water hammers, a vibration shock wave is directly transmitted to the pipe or surrounding components, thereby causing cracks or damage to an old pipe or the surrounding components. Due to the damage to the product, maintenance becomes difficult and reliability of the product is also lowered.

RELATED ART DOCUMENT

Patent Document (Patent document 1) Korean Patent Registration No. KR20-0453734 Y1

SUMMARY OF THE INVENTION

The present disclosure is directed to providing a water supply device for sanitary ceramics that includes a housing having a water supply hole and water discharge holes connected to both sides of the water supply hole by a flow path and includes an opening/closing device including a diaphragm formed above the water discharge hole of the housing, a partition cap having a support protrusion formed on the upper surface of an upper portion of the diaphragm and having a through-hole through which an upper space communicates with a lower space, a cam plate elevated while rotating along the upper surface of the partition cap to gradually open or close the through-hole, a shaft part formed above the cam plate, and a motor formed on the upper surface of the housing to rotate the shaft part, wherein the cam plate, which is rotated and elevated along the upper surface of the support protrusion of the partition cap, gradually opens or closes the through-hole of the partition cap, the diaphragm gradually opens or closes the water discharge hole, and thus flow of water discharged through the water discharge hole is prevented from being suddenly blocked.

A water supply device for sanitary ceramics includes a housing that has a hollow water supply hole formed at a lower central portion thereof, a pair of water discharge holes formed at lower ends of both sides with respect to the water supply hole, and a flow path configured to guide water flowing into the water supply hole between the water supply hole and the water discharge hole so that the water is discharged to the water discharge hole, and an opening/closing device that is installed above the water discharge hole of the housing and opens or closes an upper end of the water discharge hole, wherein the opening/closing device includes a diaphragm that is installed above the water discharge hole, has a guide hole formed at an outer edge thereof, and is vertically elevated to open or close the water discharge hole, a partition cap that is installed above the diaphragm, partitions an inside of the housing into an upper space and a lower space, has a support protrusion formed on an upper surface thereof, and has a through-hole which is vertically formed through one side surface of the support protrusion and through which the upper space communicates with the lower space, a cam plate that is in close contact with an upper surface of the support protrusion and is elevated while rotating along the upper surface of the support protrusion to gradually open or close the through-hole, a shaft part that is rotatably installed above the cam plate and has a lower end coupled to a central part of the cam plate to rotate the cam plate, a motor that is fixedly installed on an upper surface of the housing opposite to the water discharge hole and has one end connected to the shaft part to rotate the shaft part, and an elastic spring that is installed between the shaft part and the cam plate and presses the cam plate downward.

The water discharge hole of the housing may have an upper end that is located inside the lower space of the housing and may be opened or closed by the diaphragm.

The partition cap may further have an anti-contact protrusion that protrudes downward from a bottom edge of the through-hole, prevents the diaphragm spaced upward from the water discharge hole from being in close contact with a bottom surface of the partition cap, and thus maintains the diaphragm in a state of being spaced apart from the through-hole by a predetermined distance.

The support protrusion of the partition cap may form at least one recessed inclination part recessed in an upper surface thereof in a downwardly inclined direction, and the cap plate may further have an inclined protrusion that protrudes from a bottom surface thereof in a downwardly inclined direction to correspond to the recessed inclination part and is inserted into the recessed inclination part or in close contact with the upper surface of the support protrusion.

The support protrusion of the partition cap may allow the inclined protrusion of the cam plate to be inserted into the recessed inclination part to guide the cam plate so that the cam plate moves gradually downward toward the through-hole and guides the inclined protrusion of the cam plate separated from the recessed inclination part so that the inclined protrusion rises on the upper surface of the support protrusion to guide the cam plate so that the cam plate gradually moves upward in a direction opposite to the through-hole.

The partition cap may further include a manual operation lever that is inserted into and coupled to an outer surface of the support protrusion, is vertically elevated along the support protrusion, and directly presses the cam plate upward so that the cam plate closing the through-hole is lifted upward.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in more detail with reference to the accompanying drawings.

Figure 1:
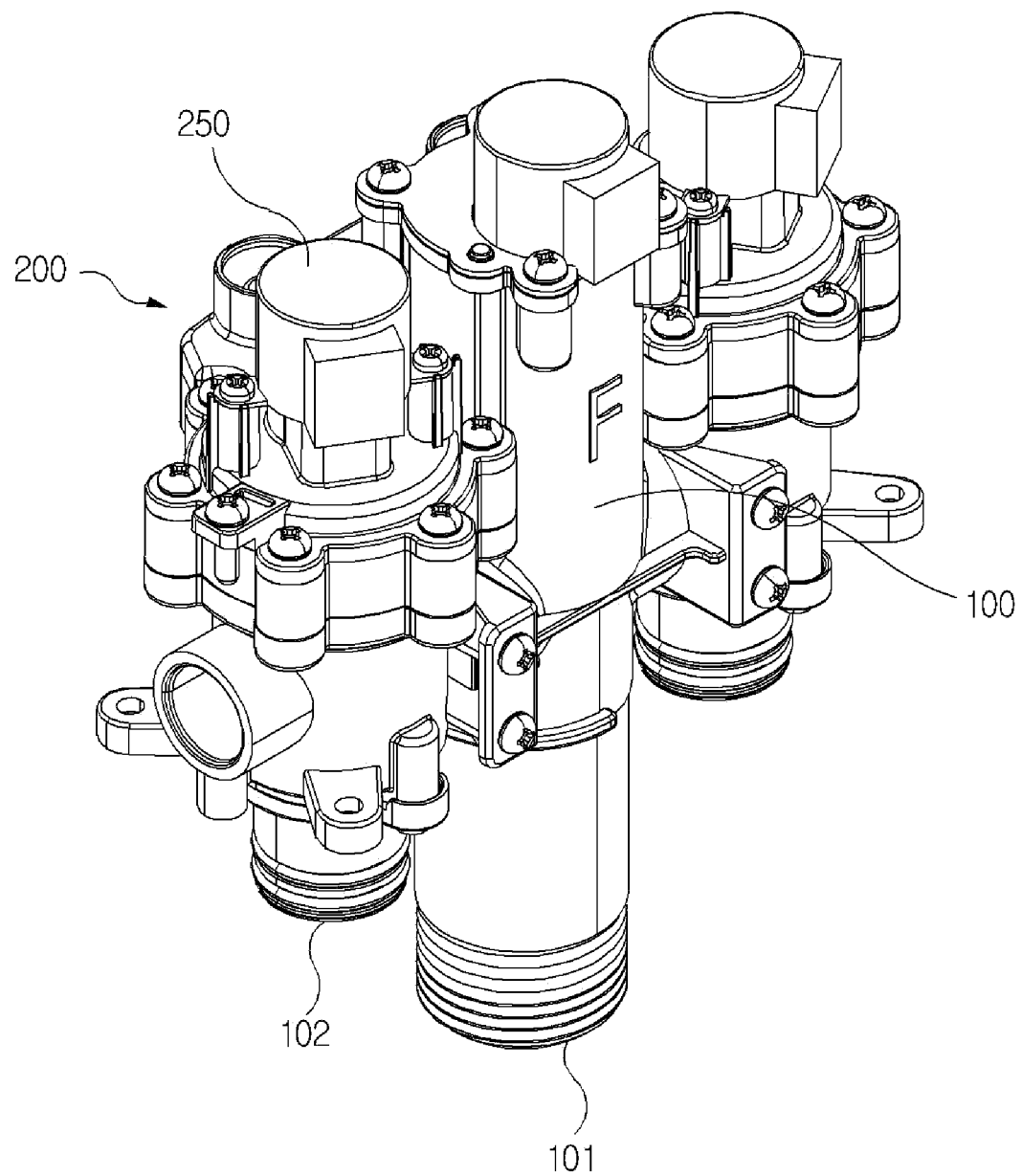
FIG. 1 is a perspective view illustrating a water supply device for sanitary ceramics according to the present disclosure.
Figure 2:
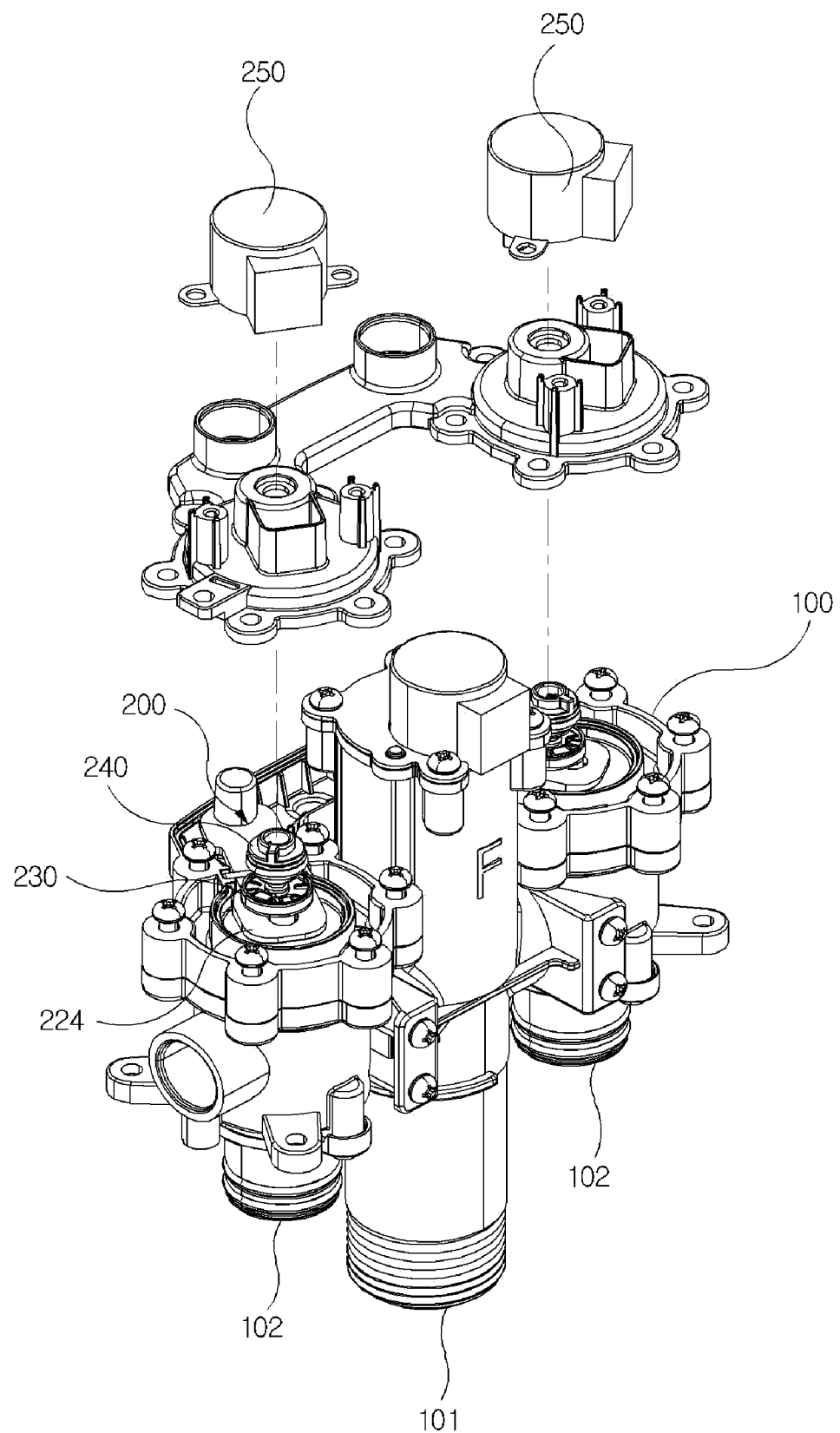
FIG. 2 is an exploded perspective view of FIG. 1.
Figure 3:
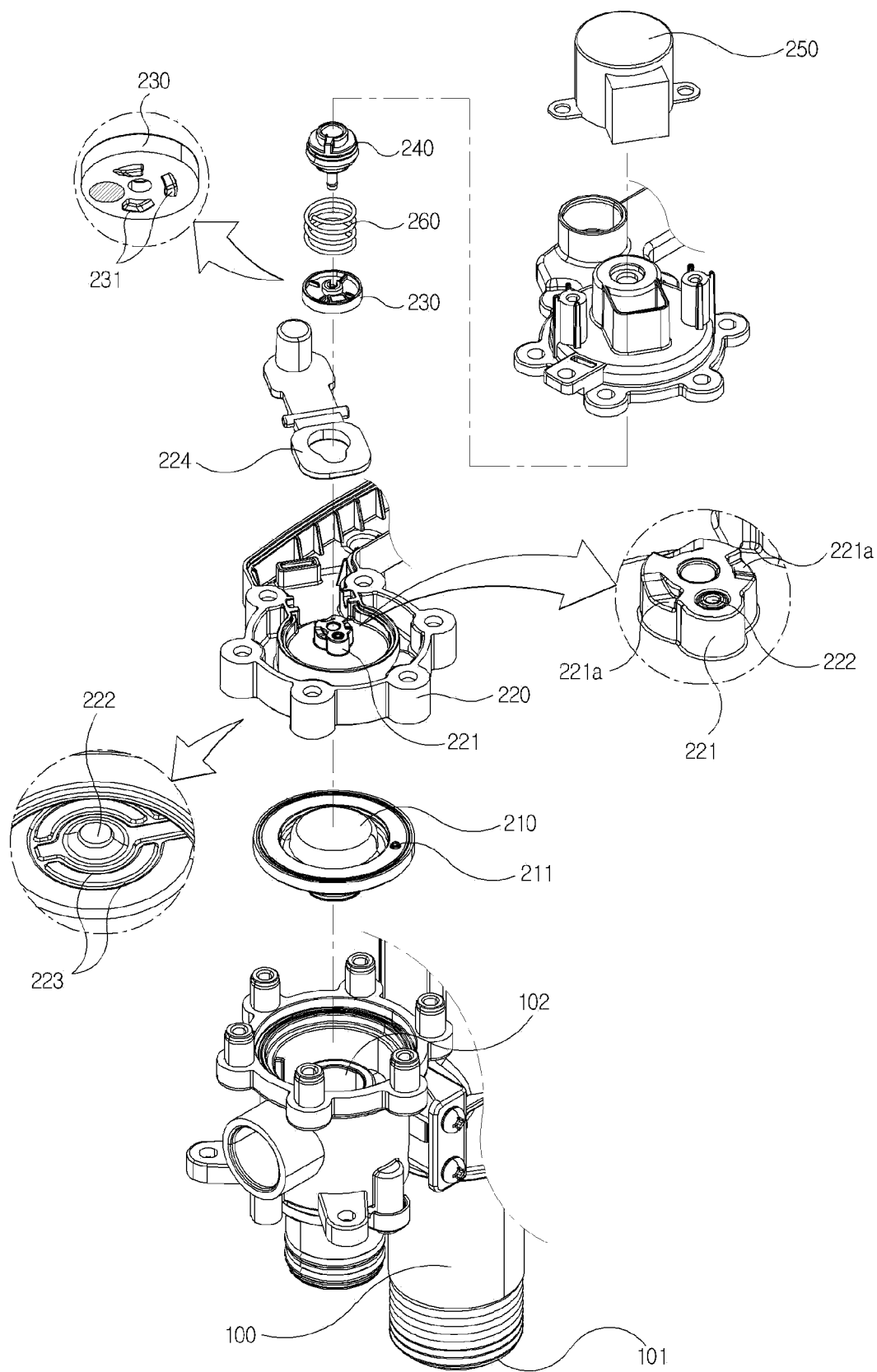
FIG. 3 is an exploded perspective view illustrating main parts of an opening/closing device of the water supply device for sanitary ceramics according to the present disclosure.
Figure 4:
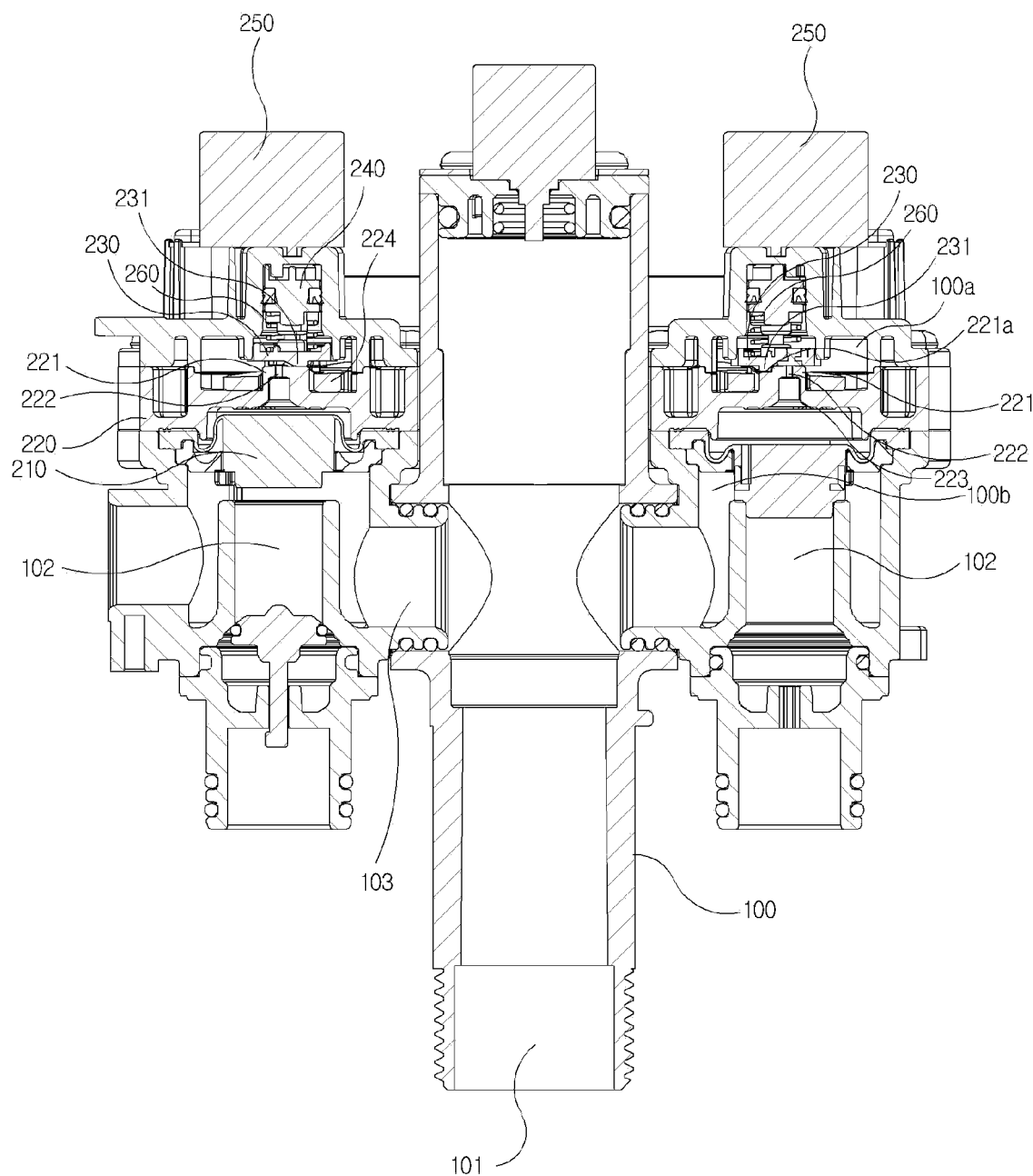
FIG. 4 is a side cross-sectional view of the water supply device for sanitary ceramics according to the present disclosure.
Figure 5:
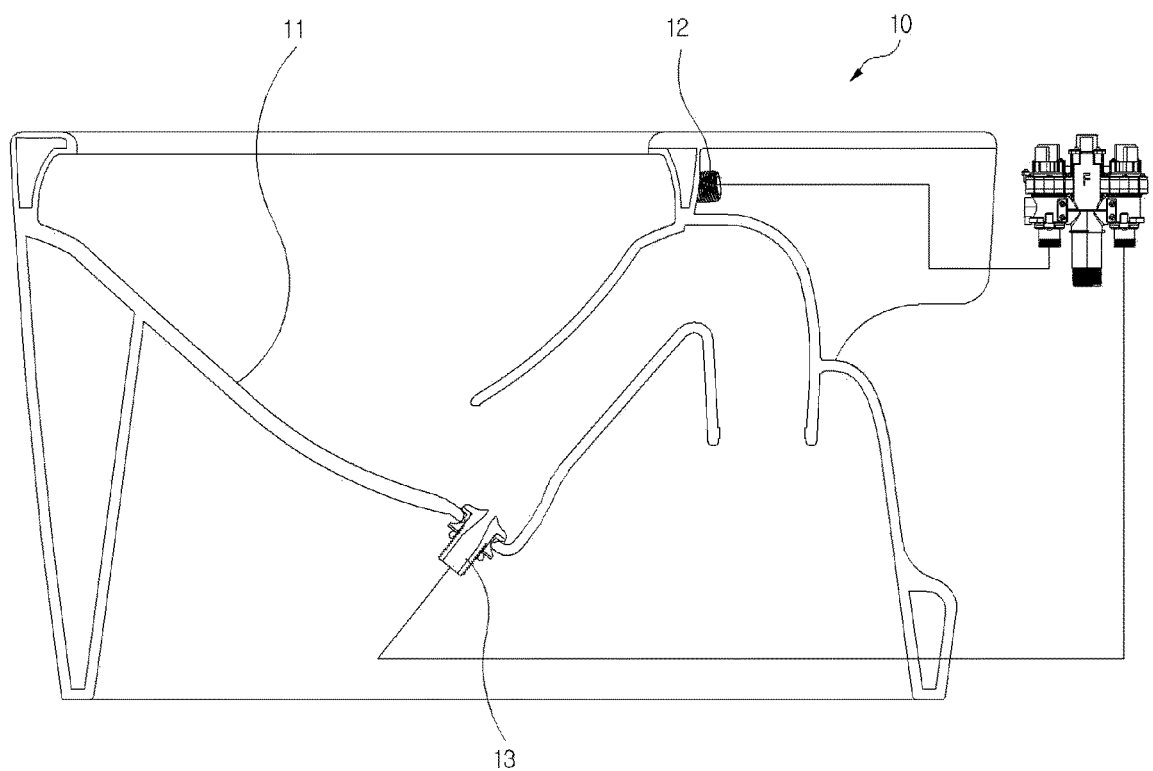
FIG. 5 is a view illustrating a state in which the water supply device for sanitary ceramics is installed in sanitary ceramics.

Referring to FIGS. 1 to 5, a housing 100 includes a hollow water supply hole 101 that is formed at a lower central portion thereof, a pair of water discharge holes 102 that are formed at lower ends of both sides of the water supply hole 101, and a flow path 103 that guides water flowing into the water supply hole 101 between the water supply hole 101 and the water discharge hole 102 so that the water is discharged through the water discharge hole 102.

The housing 100 may be installed inside sanitary ceramics 10 or installed in a bidet device (not illustrated) rotatably installed on the upper side of the sanitary ceramics 10.

The housing 100 receives water through the water supply hole 101 and guides the water to move to the water discharge hole 102 though the flow path 103.

The flow path 103 is formed perpendicularly to the water supply hole 101 and the water discharge hole 102.

The water discharge hole 102 is closed or opened by an opening/closing device 200.

An upper end of the water discharge hole 102 of the housing 100 is located inside a lower space 100b of the housing and is opened and closed by a diaphragm 210.

A backflow prevention valve (not illustrated) may be installed inside the water discharge hole 102.

The water discharge hole 102 is connected to a rim pipe 12 and a jet pipe 13 installed in a bowl part 11 of the sanitary ceramics 10.

The opening/closing device 200 is installed above the water discharge hole 102 of the housing 100 and opens or closes the upper end of the water discharge hole 102.

The opening/closing device 200 includes the diaphragm 210 that is installed above the water discharge hole 102, forms a guide hole 211 in the outer edge thereof, and is vertically elevated to open or close the water discharge hole 102, a partition cap 220 that is installed above the diaphragm 210, partitions the inside of the housing 100 into upper and lower spaces 100a and 100b, has a support protrusion 221 formed on the upper surface thereof, and has a through-hole 222 which is vertically formed through one side surface of the support protrusion 221 and through which the upper space 100a communicates with the lower space 100b, a cam plate 230 that is in close contact with the upper surface of the support protrusion 221 and is elevated while rotating along the upper surface of the support protrusion 221 to gradually open or close the through-hole 222, a shaft part 240 that is rotatably installed above the cam plate 230 and has a lower end coupled to a central part of the cam plate 230 to rotate the cam plate 230, a motor 250 that is fixedly installed on the upper surface of the housing 100 opposite to the water discharge hole 102 and has one end connected to the shaft part 240 to rotate the shaft part 240, and an elastic spring 260 that is installed between the shaft part 240 and the cam plate 230 and presses the cam plate 230 downward.

The diaphragm 210 is vertically elevated in a state in which an edge thereof is pressed and supported between edges of the housing 100 and the partition cap 220.

The diaphragm 210 allows the water remaining in the lower space 100b of the housing 100 to flow into a space between the diaphragm 210 and the partition cap 220 through the guide hole 211 of the diaphragm 210.

The diaphragm 210 is pushed by the pressure of water flowing into the space between the partition cap 220 and the diaphragm 210 to maintain the upper end of the water discharge hole 102 in a sealed state.

The pressure of the water remaining between the diaphragm 210 and the partition cap 220 may be the same as the pressure of the water remaining in the housing 100.

At a moment when the water remaining between the partition cap 220 and the diaphragm 210 is discharged to the upper space 100a of the housing 100 through the through-hole 222, the diaphragm 210 is pushed and gradually moved upward by the pressure of the water moving toward the water discharge hole 102 through the flow path 103, thereby opening the upper end of the water discharge hole 102.

The partition cap 220 partitions the housing 100 into the upper space 100a and the lower space 100b, and the cam plate 230 and the diaphragm 210 are located in the upper space 100a and the lower space 100b, respectively.

The support protrusion 221 of the partition cap 220 guides the cam plate 230 so that the cam plate 230 is gradually elevated while rotating.

The through-hole 222 is opened by the cam plate 230 to allow the water remaining in the space between the diaphragm 210 and the partition cap 220 to be discharged to the upper space 100a of the housing 100 or is closed by the cam plate 230 to allow the water to remain in the space between the diaphragm 210 and the partition cap 220.

The partition cap 220 further includes an anti-contact protrusion 223 that protrudes downward from a bottom edge of the through-hole 222, prevents the diaphragm 210 spaced upward from the water discharge hole 102 from being in contact with the bottom surface of the partition cap 220, and thus maintains the diaphragm 210 in a state of being spaced apart from the through-hole 222 by a predetermined distance.

The anti-contact protrusion 223 prevents the diaphragm 210 from being in close contact with the through-hole 222 to close the through-hole 222.

The support protrusion 221 of the partition cap 220 forms at least one recessed inclination part 221a recessed in the upper surface thereof in a downwardly inclined direction.

The recessed inclination part 221a may correspond to the shape of an inclined protrusion 231 of the cam plate 230.

The support protrusion 221 of the partition cap 220 allows the inclined protrusion 231 of the cam plate 230 to be inserted into the recessed inclination part 221a, guides the cam plate 230 so that the cam plate 230 moves gradually downward toward the through-hole 222, guides the inclined protrusion 231 of the cam plate 230 separated from the recessed inclination part 221a so that the inclined protrusion 231 rises on the upper surface of the support protrusion 221 and thus guides the cam plate 230 so that the cam plate 230 gradually moves upward in a direction opposite to the through-hole 222.

The recessed inclination part 221a allows the insertion of the inclined protrusion 231, and thus the cam plate 230 closes the through-hole 222.

The support protrusion 221 allows the inclined protrusion 231 to rise to the upper surface thereof, and thus the cam plate 230 opens the through-hole 222.

The partition cap 220 further includes a manual operation lever 224 that is inserted into and coupled to the outer surface of the support protrusion 221, is vertically elevated along the support protrusion 221, and directly presses the cam plate 230 upward so that the cam plate 230 closing the through-hole 222 is lifted upward.

The manual operation lever 224 is connected and installed to be exposed to the outside of the housing 100 and thus may be operated from an external unit.

The manual operation lever 224 is operated by a user in a state in which driving of the motor 250 is restrained.

The manual operation lever 224 may be operated by lever principle.

The cam plate 230 is formed in a circular plate shape and gradually opens or closes the through-hole 222.

The cam plate 230 is elevated while rotating along the upper surface of the support protrusion 221 by the motor 250.

The cam plate 230 opens the through-hole 222 so that the water remaining in the space between the partition cap 220 and the diaphragm 210 is discharged to the upper space 100a of the housing 100.

The cam plate 230 closes the through-hole 222 so that the water remains in the space between the partition cap 220 and the diaphragm 210.

The cam plate 230 further includes the inclined protrusion 231 that protrudes from a bottom surface thereof in a downwardly inclined direction to correspond to the recessed inclination part 221a and is inserted into the recessed inclination part 221a or in close contact with the upper surface of the support protrusion 221.

The inclined protrusion 231 gradually elevates the cam plate 230 downward toward the through-hole 222 while being inserted into the recessed inclination part 221a.

The inclined protrusion 231 gradually elevates the cam plate 230 upward in a direction opposite to the through-hole 222 while rising from the recessed inclination part 221a toward the upper surface of the support protrusion 221.

The shaft part 240 rotates the cam plate 230 in a forward or reverse direction while rotated by the motor 250.

The shaft part 240 rotates the cam plate 230 and is coupled to the cam plate 230 so that the cam plate 230 may be vertically elevated in a free fall method.

While being rotated and driven due to receiving external power, the motor 250 rotates the shaft part 240 in a forward or reverse direction.

The elastic spring 260 pushes and presses the cam plate 230 downward to block the cam plate 230 closing the through-hole 222 from being lifted upward by the pressure of the water formed in the through-hole 222.

The pressing force of the elastic spring 260 may be relatively higher than the pressure of the water between the partition cap 220 and the diaphragm 210.

The water supply device for sanitary ceramics as described above is used as follows.

The water supply device for sanitary ceramics according to the present disclosure may be installed in the sanitary ceramics 10 or in a bidet (not illustrated) installed in the sanitary ceramics 10. However, in the following description, an example in which the water supply device is installed in the sanitary ceramics 10 will be described.

First, the water discharge hole 102 of the water supply device installed in the sanitary ceramics 10 is connected to the rim pipe 12 and the jet pipe 13, and the water supply hole 101 is connected to a water faucet.

Further, when a lever (not illustrated) is operated to treat defecation and urination in the bowl part 11 of the sanitary ceramics 10, the water is supplied to the water supply hole 101 through the water faucet (not illustrated). At the same time, the opening/closing device 200 connected to the rim pipe 12 is operated in advance, and next the opening/closing device 200 connected to the jet pipe 13 is operated later.

In the following description, the water discharge hole 102 to which the rim pipe 12 is connected and the water discharge hole 102 to which the jet pipe 13 is connected are opened or closed by the opening/closing device 200 having the same operating structure.

Then, the water supplied to the water supply hole 101 moves directly upward from the water supply hole 110 and then moves toward the water discharge hole 102 through the flow path 103.

In this case, the motor 250 of the opening/closing device 200 is rotated to rotate the shaft part 240, and accordingly, the cam plate 230 installed at a lower end of the shaft part 240 is rotated by the shaft part 140 along the upper surface of the support protrusion 221.

Here, the inclined protrusion 231 formed in the cam plate 230 is inserted into the recessed inclination part 221a formed in the support protrusion 221 of the partition cap 220 and is then separated from the recessed inclination part 221a while rotated by the shaft part 240. Accordingly, the inclined protrusion 231 separated from the recessed inclination part 221a gradually elevates the cam plate 230 upward while rising toward the upper surface of the support protrusion 221.

Then, the cam plate 230 is gradually moved upward while upwardly compressing the elastic spring 260, and thus the through-hole 222 of the partition cap 220 is opened. In this case, while the water remaining between the partition cap 220 and the diaphragm 210 is discharged to the upper space 100a of the housing 100 through the through-hole 222, the pressure of the space between the partition cap 220 and the diaphragm 210 is gradually lowered.

Here, the diaphragm 210 elevated toward the bottom surface of the partition cap 220 is in close contact with the anti-contact protrusion 223, and thus the diaphragm 210 is prevented from being in close contact with the bottom surface of the partition cap 220 such as to close the through-hole 222.

In particular, the cam plate 230 is gradually spaced apart from the through-hole 222 while moving upward. Accordingly, as a gap between the cam plate 230 and the through-hole 222 is gradually widened, the amount of water discharged into the upper space 100a through the gap is increased, and thus the pressure of the water between the diaphragm 210 and the partition cap 220 is gradually lowered.

In this case, the pressure of the space between the partition cap 220 and the diaphragm 210 is lowered, and at the same time, the diaphragm 210 sealing the water discharge hole 102 is gradually pushed upward by the pressure of the water moving to the water discharge hole 102 through the flow path 103. Thus, the water discharge hole 102 is opened.

That is, as the water remaining between the diaphragm 210 and the partition cap 220 is discharged to the upper space 100a through the through-hole 222, the pressure of the water between the diaphragm 210 and the partition cap 220 is gradually lowered more than the pressure of the water applied to the bottom surface of the diaphragm 210, and thus the diaphragm 210 gradually opens the water discharge hole 102.

Thereafter, the water moving to the flow path 103 is supplied to the rim pipe 12 through the open water discharge hole 102, is discharged to the inner peripheral surface of the bowl part 11 through the rim pipe 12, and flows down along the inner peripheral surface of the bowl part 11.

Further, when the water is discharged through the water discharge hole 102 connected to the rim pipe 12, the opening/closing device 200, which opens and closes the water discharge hole 102 connected to the jet pipe 13 with a time difference, opens the water discharge hole 102 in the same manner as above.

Further, in order to fill the bowl part 11 in the sanitary ceramics 10 with the water, the opening/closing device 200 connected to the rim pipe 12 among the opening/closing device 200 is operated to be opened to discharge the water through the rim pipe 12, and thus the water fills inside of the bowl part 11.

Meanwhile, the water is completely discharged into the bowl part 11 through the rim pipe 12 or the jet pipe 13, the bowl part 11 is filled with the water, and at the same time, the motor 250 rotates the shaft part 240 in a direction opposite to the above direction.

In this case, while the shaft part 240 is rotated by the motor 250, the inclined protrusion 231 of the cam plate 230 in close contact with the upper surface of the support protrusion 221 of the partition cap 220 is rotated to be inserted toward the recessed inclination part 221a of the support protrusion 221.

Then, the cam plate 230 is pressed downward by the restoring force of the elastic spring 260. In this case, the inclined protrusion 231 is inserted into the recessed inclination part 221a while rotated downward toward the recessed inclination part 221a in a downwardly inclined direction. Accordingly, the cam plate 230 is gradually moved downward to approach the through-hole 222 of the partition cap 220.

Here, as the cam plate 230 gradually approaches the through-hole 222, the amount of water discharged to the upper space 100a through the through-hole 222 is gradually reduced, and the amount of water flowing between the partition cap 220 and the diaphragm 210 through the guide hole 211 of the diaphragm 210 and remaining between the diaphragm 210 and the partition cap 220 is gradually increased. Thus, the pressure of the water is gradually increased in proportion to the amount of the water.

That is, as the pressure of the water remaining between the partition cap 220 and the diaphragm 210 is gradually increased, the diaphragm 210 is gradually pressed toward the water discharge hole 102, and thus the diaphragm 210 is gradually moved downward.

In this case, the water moving toward the water discharge hole 102 through the water supply hole 101 and the flow path 103 of the housing 100 is discharged to the water discharge hole 102 through a gap between the diaphragm 210 and the water discharge hole 102, the gap being gradually narrowed by the elevation movement of the diaphragm 210. Thus, as the moving flow of the water is gradually reduced, the water is prevented from colliding with the diaphragm 210 due to the flow rate of the water moving toward the water discharge hole 102 through the flow path 103.

Further, at a moment when the cam plate 230 is moved downward to seal the through-hole 222, the pressure of the water flowing between the partition cap 220 and the diaphragm 210 through the guide hole 211 becomes the same as the pressure of the water applied to the bottom surface of the diaphragm 210. Accordingly, the diaphragm 210 is maintained in a state of sealing the upper end of the water discharge hole 102.

On the other hand, when the operation of the motor 250 is limited or the rotation of the cam plate 20 is limited due to an abnormal operation of the motor 250, the manual operation lever 224 installed inside the partition cap 220 is operated by an external unit. In this case, the manual operation lever 224 is elevated upward along the outer surface of the support protrusion 221 to press the cam plate 230 upward.

Then, the cam plate 230 is moved upward to open the through-hole 222. Thereafter, the diaphragm 210 is separated from the water discharge hole 102 in the same method as above, and thus the water discharge hole 102 is opened.

Here, in the present disclosure, an example in which the manual operation lever 224 is installed inside the partition cap 220 has been described. However, the manual operation lever 224 may be connected to an operation lever (not assigned a number) exposed to the outside of the housing 100 and is elevated and operated by the operation lever (not assigned a number).

As described above, a structure is provided in which the through-hole 222 is gradually opened or closed by the cam plate 230 rotated and elevated along the upper surface of the support protrusion 221 and the diaphragm 210 is gradually opened or closed to correspond to the opening amount of the through-hole 222. In this structure, as the cam plate 230 is gradually elevated while rotated along the upper surface of the support protrusion 221 of the partition cap 220, the through-hole 222 of the partition cap 220 is gradually opened or closed. As the diaphragm 210 gradually opens or closes the upper end of the water discharge hole 102 to correspond to the gradual opening or closing of the through-hole 222, the flow of the water discharged to the water discharge hole 102 is prevented from being rapidly blocked. Further, as the moving flow of the water discharged to the water discharge hole 102 is gradually lowered, there is no risk of water hammer occurring when the water collides with the diaphragm 210.

According to the present disclosure, the cam is gradually elevated while rotating along the upper surface of the support protrusion of the partition cap, and thus the through-hole of the partition cap is gradually opened or closed. As the diaphragm gradually opens or closes the upper end of the water discharge hole to correspond to the gradual opening or closing of the through-hole, the flow of the water discharged to the water discharge hole is prevented from being rapidly blocked. Further, as the moving flow of the water discharged to the water discharge hole is gradually lowered, there is no risk of water hammer occurring when the water collides with the diaphragm 210. In particular, while the water hammer is prevented, the occurrence of vibrations caused by impacts on pipes or components is prevented, and thus damage or cracks applied to the pipes and the components are prevented. Accordingly, the convenience of maintenance is improved, and at the same time, the reliability of product is improved.

The water supply device for sanitary ceramics according to the present disclosure as described above is not limited to the above embodiment, and those skilled in the art to which the present disclosure pertains can variously modify the present disclosure without departing from the subject matter of the present disclosure as described in the appended claims.

What is claimed is:

1. A water supply device for sanitary ceramics, comprising:
   a housing that has a hollow water supply hole formed at a lower central portion thereof, a pair of water discharge holes formed at lower ends of both sides with respect to the water supply hole, and a flow path configured to guide water flowing into the water supply hole between the water supply hole and the water discharge hole so that the water is discharged to the water discharge hole; and
   an opening/closing device that is installed above the water discharge hole of the housing and opens or closes an upper end of the water discharge hole,
   wherein the opening/closing device includes:
   a diaphragm that is installed above the water discharge hole, has a guide hole formed at an outer edge thereof, and is vertically elevated to open or close the water discharge hole;
   a partition cap that is installed above the diaphragm, partitions an inside of the housing into an upper space and a lower space, has a support protrusion formed on an upper surface thereof, and has a through-hole which is vertically formed through one side surface of the support protrusion and through which the upper space communicates with the lower space;
   a cam plate that is in close contact with an upper surface of the support protrusion and is elevated while rotating along the upper surface of the support protrusion to gradually open or close the through-hole;
   a shaft part that is rotatably installed above the cam plate and has a lower end coupled to a central part of the cam plate to rotate the cam plate;
   a motor that is fixedly installed on an upper surface of the housing opposite to the water discharge hole and has one end connected to the shaft part to rotate the shaft part; and
   an elastic spring that is installed between the shaft part (240) and the cam plate and presses the cam plate downward,
   wherein:
   the support protrusion of the partition cap forms at least one recessed inclination part recessed in an upper surface thereof in a downwardly inclined direction; and
   the cam plate further has an inclined protrusion that protrudes from a bottom surface thereof in a downwardly inclined direction to correspond to the recessed inclination part and is inserted into the recessed inclination part or in close contact with the upper surface of the support protrusion.

2. The water supply device of claim 1, wherein the water discharge hole of the housing has an upper end that is located inside the lower space of the housing and is opened or closed by the diaphragm.

3. The water supply device of claim 1, wherein the partition cap further has an anti-contact protrusion that protrudes downward from a bottom edge of the through-hole, prevents the diaphragm spaced upward from the water discharge hole from being in close contact with a bottom surface of the partition cap, and thus maintains the diaphragm in a state of being spaced apart from the through-hole by a predetermined distance.

4. The water supply device of claim 1, wherein the support protrusion of the partition cap allows the inclined protrusion of the cam plate to be inserted into the recessed inclination part to guide the cam plate so that the cam plate moves gradually downward toward the through-hole, and guides the inclined protrusion of the cam plate separated from the recessed inclination part so that the inclined protrusion rises on the upper surface of the support protrusion to guide the cam plate so that the cam plate gradually moves upward in a direction opposite to the through-hole.

5. The water supply device of claim 1, wherein the partition cap further includes a manual operation lever that is inserted into and coupled to an outer surface of the support protrusion, is vertically elevated along the support protrusion, and directly presses the cam plate upward so that the cam plate closing the through-hole is lifted upward.

6. The water supply device of claim 1, wherein the water remaining in the lower space of the housing is allowed to flow into a space between the diaphragm and the partition cap through the guide hole.

7. The water supply device of claim 1, wherein the device reaches a first state in which the diaphragm is blocked and the water does not flow.

\* \* \* \* \*